(12) United States Patent
Mitsutani et al.

(10) Patent No.: US 6,191,232 B1
(45) Date of Patent: Feb. 20, 2001

(54) PROPYLENE BLOCK COPOLYMER

(75) Inventors: Kenji Mitsutani; Kiyoshi Yukawa; Fumihiko Shimizu, all of Kurashiki (JP); Glen H. Ko, Cambridge, MA (US); Eiji Tanaka; Fuminao Watanabe, both of Kurashiki (JP)

(73) Assignee: Mitsubishi Chemical Corporation, Tokyo-To (JP)

(*) Notice: Under 35 U.S.C. 154(b), the term of this patent shall be extended for 0 days.

(21) Appl. No.: 09/165,095

(22) Filed: Oct. 2, 1998

(30) Foreign Application Priority Data

Oct. 2, 1997 (JP) .................................................. 9-269525

(51) Int. Cl.⁷ .............................. C08F 293/00; C08F 2/34
(52) U.S. Cl. .......................... 525/323; 525/240; 525/243; 525/244; 525/245; 525/247
(58) Field of Search ..................................... 525/323, 240, 525/243, 244, 245, 247

(56) References Cited

U.S. PATENT DOCUMENTS 5,859,143 * 1/1999 Tanaka et al. ........................ 525/323

* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

The present invention provides a propylene block copolymer comprising polymer particles whose rubber-like component contents are 50% by weight or more, in an amount less than 1.0% by weight of the whole polymer particles finally discharged from a polymerization system.

16 Claims, 2 Drawing Sheets

PROPYLENE BLOCK COPOLYMER

BACKGROUND OF THE INVENTION

1. Technical Field

The present invention relates to propylene block copolymers excellent in rigidity and impact resistance, and, more particularly, to propylene block copolymers produced by a continuous polymerization method, excellent in rigidity and impact resistance, and also in a balance of these two properties.

2. Background Art

As methods for improving the impact resistance of crystalline polypropylene, there have been known (1) a method in which propylene is copolymerized with a small amount of an -olefin; (2) a method in which polypropylene is mechanically blended with a rubber component; and (3) a so-called block copolymerization method in which polymerization for polymerizing propylene as a main component is firstly effected, followed by copolymerization of propylene with an α-olefin other than propylene.

However, the method (1) seems to have such a shortcoming that, although it brings about good effect of improving impact resistance, it provides greatly reduced rigidity. Further, the method (2) provides an improved balance of rigidity and impact resistance, but is economically disadvantageous because rubber that is used for blending is generally expensive.

The block copolymerization method (3) is most commonly used, in the light of such a background, to improve the impact resistance of crystalline polypropylene. The block copolymerization method is such that a rubber-like component which is a copolymer of propylene and ethylene or the like is produced in the presence of a polymer containing propylene as a main component. In this method, the two components are produced via successive polymerization processes, and then blended. Therefore, the block copolymerization method is also called chemical blend, and conveniently used.

For conducting block copolymerization, a continuous polymerization method in which respective blocks are continuously produced in separate polymerization tanks is more economically advantageous than a batch polymerization method in which respective blocks are produced in one polymerization tank. In such a continuous polymerization method, it is common to polymerize propylene as a main component in the first stage, and to carry out polymerization for producing a rubber-like component in the second stage. In particular, the most commonly used is a method in which propylene homopolymer is produced in the first stage, and a rubber-like component that is an ethylene-propylene copolymer usually called EPR is produced in the second stage. It is noted that the first stage and second stage are not always correspond to polymerization tanks; and there is also a case where a plurality of polymerization tanks are used for each stage.

In general, propylene block copolymers obtained by continuous polymerization methods tend to be poor in impact resistance as compared with those ones obtained by batch polymerization methods.

In order to solve this problem, methods utilizing classification have been proposed, for example, in Japanese Patent Laid-Open Publications No. 135987/1976 and No. 116716/1980. Further, there has also been known such a method in which a certain compound is added to a polymerization tank that is used for producing a rubber-like component in the second stage. For instance, Japanese Patent Laid-Open Publication No. 115417/1980 discloses the addition of tertiary amines, ketones, ethers, esters, acid amides, phosphoric amides and the like; Japanese Patent Laid-Open Publication No. 147508/1982 discloses the addition of halogen-containing aluminum compounds; Japanese Patent Laid-Open Publication No. 69821/1986 discloses the addition of alcohols; Japanese Patent Laid-Open Publication No. 116618/1987 discloses the addition of glycol ethers; and Japanese Patent Laid-Open Publication No. 152116/1989 discloses the addition of hydrogen sulfide.

However, it cannot be said that these methods are sufficiently effective for improving the balance of rigidity and impact resistance. An object of the present invention is therefore to provide, by a continuous polymerization method, propylene block copolymers which have physical properties comparable to those of propylene block copolymers obtained by batch polymerization methods.

SUMMARY OF THE INVENTION

We found that propylene block copolymers having physical properties comparable to those of propylene block copolymers obtained by batch polymerization methods can be obtained even by a continuous polymerization method if the polymerization conditions are so controlled that the proportion of those polymer particles whose rubber-like component contents are 50% by weight or more will be less than 1.0% by weight of the whole polymer particles finally discharged from a polymerization system.

Thus, the present invention provides a propylene block copolymer comprising polymer particles whose rubber-like component contents are 50% by weight or more, in an amount less than 1.0% by weight of the whole polymer particles finally discharged from a polymerization system.

DETAILED DESCRIPTION OF THE INVENTION

The present invention will be described in detail hereinafter. A propylene block copolymer according to the present invention has come to be obtained by conducting polymerization so that the proportion of those polymer particles whose rubber-like component contents are 50% by weight or more will be less than 1.0% by weight of the whole polymer particles finally discharged from a polymerization system.

In the production of a propylene block copolymer by a continuous polymerization method, the rubber-like component contents of the polymer particles produced are not the same at all when each polymer particle is viewed. The polymer produced is an aggregate of these polymer particles having different rubber-like component contents, and the rubber-like component content of the polymer is merely a mean value of the rubber-like component contents of the individual polymer particles.

From our studies, it was found that, among polymer particles produced by a continuous polymerization method, those polymer particles whose rubber-like component contents are 50% by weight or more are not completely melted but gelled in the polymer under the normal melt-kneading conditions. If gels are present in a polymer, the stress is excessively concentrated at the gel-gel interface, so that this interface tends to be a breaking point. In a propylene copolymer produced by a conventional continuous polymerization method, polymer particles constituting the polymer have a residence time distribution within a polymerization system. Due to this residence time distribution, the polymer is to contain a considerably large amount of polymer particles whose rubber-like component contents are 50% by weight or more. For this reason, it is considered that propylene copolymers produced by conventional continuous polymerization methods have low impact resistance, especially low-temperature impact resistance as compared with propylene copolymers obtained by batch polymerization methods.

In a continuous polymerization method, it is unavoidable that the polymer particles produced have a residence time distribution within a polymerization system, so that they have different rubber-like component contents. It is therefore considered to be impossible to produce a propylene copolymer containing no polymer particles whose rubber-like component contents are 50% by weight or more (in the case of a propylene copolymer produced by a batch process, the respective polymer particles have almost the same rubber-like component content). We therefore studied the relationship between the proportion, to the whole polymer particles, of those polymer particles whose rubber-like component contents are 50% by weight or more, and the properties, especially the impact resistance of the polymer. As a result, we found the following: in order to ensure physical properties comparable to those of polymers obtained by batch processes, the proportion of those polymer particles whose rubber-like component contents are 50% by weight or more should be made less than 1.0% by weight of the whole polymer particles produced. The lower is this proportion, the more favorable is the polymer. It is preferable that the proportion of those polymer particles whose rubber-like component contents are 50% by weight or more be less than 0.7% by weight, particularly less than 0.5% by weight.

A propylene copolymer according to the present invention, in which the proportion of those polymer particles whose rubber-like component contents are 50% by weight or more is less than 1.0% by weight of the whole polymer particles, can be produced by some methods. For example, the formation of polymer particles whose rubber-like component contents are 50% by weight or more can be suppressed by preventing, by the use of a classifier, the transfer of polymer particles having small particle diameters produced in the first stage for producing a crystalline propylene polymer, to the second stage for producing a rubber-like component. This is because the residence time of polymer particles having small particle diameters is short; it is therefore considered that the lowering of catalytic activity is small, while the copolymerization activity is high. However, when a solid catalyst component that is used for polymerization has a wide particle diameter distribution, it cannot necessarily be said that the residence time of polymer particles having small particle diameters is short. Therefore, this method is effective when it is combined with the use of a solid catalyst component having a narrow particle diameter distribution. Further, it is also effective, as another method, to suppress the copolymerization activity of a catalyst that is used in the second stage for producing a rubber-like component. This is because the activity of a catalyst having higher activity is considered to be more strongly suppressed, so that the activity becomes uniform as a whole. In order to attain this, a compound which is generally known as a catalytic poison may be added to a polymerization reactor for use in the second stage. For example, by feeding a catalytic poison to a polymerization reactor in the second stage, in an amount proper to an organoaluminum compound which is fed to the polymerization reactor in the second stage along with the polymer particles from the first stage, and by controlling the amount of the catalytic poison to be fed, the copolymerization activity can be controlled. Of course, by the combination use of this manner and the above-described treatments in the first and second stages, the formation of polymer particles whose rubber-like component contents are 50% by weight or more can be controlled more effectively.

A process for producing a propylene block copolymer according to the present invention, containing less than 1.0% by weight of polymer particles whose rubber-like component contents are 50% by weight or more, by a conventional continuous polymerization method which is a combination of bulk polymerization of propylene, first stage, and gaseous phase polymerization, second stage, will be described in detail hereinafter.

<Polymerization in First Stage>

In the first stage, polymerization for polymerizing propylene as a main component, that is, either homopolymerization of propylene, or copolymerization of propylene and a small amount of another α-olefin is carried out. An α-olefin having 2 to 18 carbon atoms, particularly 2 to 8 carbon atoms, such as ethylene, 1-butene, 1-pentene, 1-hexene or 1-octene is used as another α-olefin. Preferably, ethylene or 1-butene is used. In general, when the amount of an α-olefin to be copolymerized is increased, the resulting block copolymer has improved transparency and anti-whitening. However, this amount is made excessively large, the resulting block copolymer has impaired rigidity and heat resistance. Therefore, the amount of an α-olefin to be copolymerized is generally 5% by weight or less, preferably 3% by weight or less.

This polymerization in the first stage is effected by continuously feeding, to a polymerization tank, a stereoregular catalyst or various components thereof such as a solid catalyst component, a co-catalyst and an electron donor compound, propylene, another α-olefin for copolymerization, and hydrogen.

<Stereoregular Catalyst>

A stereoregular catalyst for use in the present invention comprises a solid catalyst component, an organoaluminum compound, and, if necessary, an electron donor compound and the like.

This stereoregular catalyst is essentially the same as conventional ones except that its solid catalyst component has a sharp particle diameter distribution. It is noted that the "sharp particle diameter distribution" means that "n" which represents the particle diameter distribution approximated by the Rosin-Rammler distribution is equal to or greater than 5.

Stereoregular catalysts composed of solid catalyst components, organoaluminum compounds, and, if necessary, electron donor compounds and the like have been known by, for example, Japanese Patent Laid-Open Publications No. 811/1981, No. 83006/1983, No. 218507/1992, No. 25338/1994, No. 63311/1982, No. 213208/1986, No. 187706/1987, No. 331233/1983, No. 331234/1983, No. 289004/1988, No. 319508/1989, No. 98706/1977, No. 54007/1989 and No. 72503/1991. In the present invention, those stereoregular catalysts which fulfill the above-described requirement regarding particle diameter distribution, selected from the catalysts disclosed in the above-listed patent publications may be used.

The details of the above-described requirement, sharp particle diameter distribution, and those of preferable solid catalyst components which can fulfill this requirement will be given later.

Solid Catalyst Component

The solid catalyst component is generally composed of magnesium, titanium and a halogen, and, in many cases, further contains an electron donor compound. This solid catalyst component may also be used in the form of being supported on a carrier containing as a main component silica, alumina, silica-alumina, any other metal oxide or double oxide, or the like.

Magnesium in the solid catalyst component can be obtained from magnesium halides such as magnesium chloride, magnesium bromide, magnesium iodide and magnesium fluoride; alkoxymagnesium halides such as methoxy-magnesium chloride, ethoxymagnesium chloride, isopropoxymagnesium chloride, butoxymagnesium chloride, hexoxymagnesium chloride and octoxymagnesium chloride; allyloxymagnesium halides such as phenoxymagnesium chloride and methylphenoxymagnesium chloride; alkoxymagnesiums such as methoxy-magnesium, ethoxymagnesium, isopropoxymagnesium, n-butoxymagnesium, n-octoxymagnesium and 2-ethylhexoxymagnesium; allyloxymagnesiums such as phenoxy-magnesium and methylphenoxymagnesium; and magnesium carboxy-lates such as magnesium laurate and magnesium stearate. These magnesium compounds can be used either singly or as a mixture of two or more members.

Titanium in the solid catalyst component can generally be obtained from tetravalent titanium compounds represented by $Ti(OR)_g X_{4-g}$ (wherein R represents a hydrocarbon group, X represents a halogen, and g is a number from 0 to 4 inclusive), specifically titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O\text{-}n\text{-}C_4H_9)Cl_3$, $Ti(O\text{-}i\text{-}C_4H_9)Cl_3$, $Ti(OCH_3)Br_3$, $Ti(OC_2H_5)Br_3$, $Ti(O\text{-}n\text{-}C_4H_9)Br_3$ and $Ti(O\text{-}i\text{-}C_4H_9)Br_3$; alkoxytitanium dihalides such as $Ti(OCH_3)_2Cl_2$, $Ti(OC_2H_5)_2Cl_2$, $Ti(O\text{-}n\text{-}C_4H_9)_2Cl_2$, $Ti(O\text{-}n\text{-}C_4H_9)_2Cl_2$, $Ti(OCH_3)_2Br_2$, $Ti(OC_2H_5)_2Br_2$, $Ti(O\text{-}n\text{-}C_4H_9)_2Br_2$ and $Ti(O\text{-}i\text{-}C_4H_9)_2Br_2$; alkoxytitanium monohalides such as $Ti(OCH_3)_3Cl$, $Ti(OC_2H_5)_3Cl$, $Ti(O\text{-}n\text{-}C_4H_9)_3Cl$, $Ti(O\text{-}i\text{-}C_4H_9)_3Cl$, $Ti(OCH_3)_3Br$, $Ti(OC_2H_5)_3Br$, $Ti(O\text{-}n\text{-}C_4H_9)_3Br$ and $Ti(O\text{-}i\text{-}C_4H_9)_3Br$; tetraalkoxytitaniums such as $Ti(OCH_3)_4$, $Ti(OC_2H_5)_4$, $Ti(O\text{-}n\text{-}C_4H_9)_4$ and $Ti(O\text{-}i\text{-}C_4H_9)_4$; and mixtures thereof. Alternatively, titanium can also be obtained from mixtures of the above-enumerated titanium compounds, and aluminum compounds, silicon compounds, sulfur compounds, other metallic compounds, hydrogen halides or halogens. Halogen is generally introduced by tetravalent titanium halide compounds represented by the above general formula $Ti(OR)_g X_{4-g}$, hydrogen halides, halogens or the like.

Those compounds which are conventionally used for the production of solid catalyst components of this type can be used as the electron donor compound. In general, oxygen- or nitrogen-containing compounds are preferred as this compound. Examples of oxygen-containing compounds include ethers, ketones, esters and alkoxysilanes; and examples of nitrogen-containing compounds include amines, amides and nitroso compounds.

Organoaluminum Compound

Any purposive compound can be used as the organoaluminum compound which acts as a co-catalyst for the stereoregular catalyst. For instance, the following compounds can be used: (a) trialkylaluminums, for example, those ones in which each alkyl group contains 1 to 12 carbon atoms, such as trimethyl-aluminum, triethylaluminum, tri-n-propylaluminum, triisobutylaluminum, trihexylaluminum, trioctylaluminum, tridecylaluminum and tridodecylaluminum; (b) halogen-containing organoaluminum compounds obtainable by substituting one or two alkyl groups in the above-described trialkylaluminums with a halogen such as chlorine or bromine, for instance, diethylaluminum chloride and ethyl- aluminum sesquichloride; (c) hydride-containing organoaluminum compounds obtainable by substituting one or two alkyl groups in the above-described trialkyl- aluminums with hydrogen, for instance, diethylaluminum hydride; (d) alkoxide-containing organoaluminum compounds obtainable by substituting one or two alkyl groups in the above-described trialkylaluminums with an alkoxy group (including an aryloxy group), especially one having approximately 1 to 8 carbon atoms, for example, dimethylaluminum methoxide, diethylaluminum methoxide and diethylaluminum phenoxide; and (e) aluminoxanes, for example, those ones whose alkyl group contains 1 to 12 carbon atoms, such as methylaluminoxane, ethylaluminoxane and isobutylaluminoxane. These compounds can be used either singly or in combination.

There is no particular limitation on the amount of the organo-aluminum compound to be used. In general, however, the organoaluminum compound is used in such an amount that the atomic ratio of aluminum in the organoaluminum compound to titanium contained in the solid catalyst component will be from 0.1 to 10,000, preferably from 10 to 5,000, more preferably from 50 to 2,000.

Electron Donor Compound

An oxygen- or nitrogen-containing compound is preferably used as the electron donor compound as mentioned previously.

Examples of nitrogen-containing compounds include amines and derivatives thereof such as triethylamine, ethylenediamine, diisopropylamine, di-t-butylamine, pyridine, piperidine and 2,2,6,6-tetramethylpiperidine, tertiary amines, and nitroso compounds such as N-oxides of pyridine and of quinoline.

Examples of oxygen-containing compounds generally include ethers, ketones, esters and alkoxysilanes.

Examples of ethers include those compounds in which the total number of carbon atoms contained in hydrocarbon residues combined with ether oxygen is approximately 2 to 18, preferably about 4 to 12, such as diethyl ether, dipropyl ether, diethylene glycol dimethyl ether, propylene glycol dimethyl ether, ethylene oxide, tetrahydrofuran, 2,2,5,5-tetramethyltetrahydrofuran and dioxane. Examples of ketones include those compounds in which the total number of carbon atoms contained in hydrocarbon residues combined with carbonyl group in a ketone is approximately 2 to 18, preferably about 4 to 12, such as acetone, diethyl ketone, methyl ethyl ketone and acetophenone. Examples of esters preferably include those compounds whose carboxylic acid moiety is an aryl or aralkyl carboxylic acid, whose aryl moiety is phenyl group which may be substituted with a lower alkyl or alkoxy group and which have 1 to 3 carboxylic acid groups. It is preferable that the number of carbon atoms contained in the alkyl moiety of the aralkyl carboxylic acid be from 1 to 6. Also in the case of an aliphatic carboxylic acid, the alkyl chain thereof may contain ether oxygen; and those aliphatic carboxylic acids which have 1 to 20 carbon atoms, preferably 2 to 12 carbon atoms, and 1 to 3 carboxylic acid groups are preferred. The alcohol moieties of the esters contain 1 to 8 carbon atoms, preferably 1 to 4 carbon atoms; and the carbon chains of the esters may contain ether oxygen. Inner esters of hydroxy carboxylic acids corresponding to the above-described carboxylic acids, that is, lactones are also preferred. Some examples of such esters are as follows: ethyl phenylacetate, methyl benzoate, ethyl benzoate, phenyl benzoate, methyl toluate, ethyl toluate, methyl anisate, ethyl anisate, methyl methoxybenzoate, ethyl methoxybenzoate, methyl methacrylate, ethyl methacrylate, dimethyl phthalate, diethyl phthalate, dipropyl phthalate, dibutyl phthalate, diisobutyl phthalate, dihexyl phthalate, γ-butyrolactone and ethyl cellosolve. Examples of alkoxysilanes include those compounds having at least one alkoxy group (having preferably about 1 to 18 carbon atoms, particularly about 1 to 4 carbon atoms, aryloxy groups being included), the other silicon valences being satisfied with alkyl, aryl or aralkyl groups, such as tetramethoxysilane, ethyltrimethoxysilane, n-propyltrimethoxysilane, isopropyltrimethoxysilane, t-butyltrimethoxysilane, phenyltrimethoxysilane, cyclohexyltrimethoxysilane, 1-methylcyclohexyltrimethoxysilane, 1,1,2,2-tetramethylpropyltrimethoxysilane, diethyldimethoxysilane, di-n-propyl-dimethoxysilane, diisopropyldimethoxysilane, diphenyldimethoxysilane, t-butylmethyldimethoxysilane, t-butylethyldimethoxysilane, t-butyl-n-propyldimethoxysilane, t-butylisopropyldimethoxysilane, cyclohexylmethyl-dimethoxysilane, dicyclohexyldimethoxysilane, 1-methylcyclohexylmethyl-dimethoxysilane, 1,1,2,2-tetramethylpropylmethyldimethoxysilane, ethyltriethoxysilane, n-propyltriethoxysilane, isopropyltriethoxysilane, t-butyl-triethoxysilane, phenyltriethoxysilane, cyclohexyltriethoxylsilane, 1-methylcyclohexyltriethoxysilane, 1,1,2,2-tetramethylpropyltriethoxysilane, diethyldiethoxysilane, di-n-propyldiethoxysilane, diisopropyldiethoxysilane, diphenyldiethoxysilane, t-butylmethyldiethoxysilane, t-butylethyldiethoxysilane, t-butyl-n-propyldiethoxysilane, cyclohexylmethyldiethoxysilane, cyclohexylethyl-diethoxysilane, 1-methylcyclohexylmethyldiethoxylsilane and 1,1,2,2-tetramethyl-propylmethyldiethoxysilane.

Of these compounds, piperidine and alkoxysilanes are preferred, and alkoxysilanes are particularly preferred.

There is no particular limitation on the amount of these compounds to be used. However, in general, the compound is used in such an amount that the molar ratio of the compound to aluminum contained in the organoaluminum compound used as a co-catalyst will be from 0 to 10, preferably from 0 to 2. The electron donor compounds may also be used either singly or in combination.

Formation of Stereoregular Catalyst

When the catalyst components, that is, the solid catalyst component, the organoaluminum compound, and, if necessary, the electron donor compound are brought into contact at the inside or outside of a polymerization tank, in the presence or absence of propylene, a stereoregular catalyst is formed.

The catalyst components may be fed to the polymerization tank separately, or after they have been brought into contact in advance. In the latter case, the catalyst components may be brought into contact in any manner. Namely, the components may be brought into contact either at the one time or successively. There is no particular limitation also on the manner in which these catalyst components are fed to the polymerization tank. They may be fed after they are dissolved or suspended in an inert hydrocarbon solvent such as propane, butane, pentane, hexane, heptane, octane, nonane, decane, toluene or xylene. Alternatively, they may also be fed directly without using any of these inert hydrocarbon solvents.

Polymerization

For polymerization in the first stage, it is convenient to employ a polymerization method using liquid propylene as a medium. This is because the polymerization method using liquid propylene as a medium is advantageous in that not only high catalytic efficiency can be obtained in a short time, but also a wet classifier can be used as a classification system. Wet classification generally gives higher classification efficiency than that given by dry classification, so that it is advantageous to prevent the short pass of particles having small particle diameters from the first-stage polymerization. Further, when a sedimentation liquid force classifier is used as the wet classifier, liquid propylene can be used as a classification medium, so that it is not necessary to use any other medium. Furthermore, there is also such an advantage that the polymer produced can easily be separated from unreacted propylene.

The polymerization temperature is generally from 40 to 120° C., preferably from 50 to 90° C. There is no particular limitation also on the polymerization pressure. In general, however, it is from 1 to 100 atm, preferably from 5 to 40 atm.

The polymerization is carried out in the presence of hydrogen. Hydrogen is fed to a polymerization tank so that a polymer having the desired melt flow rate (hereinafter referred to as MFR) will be produced.

The MFR of a propylene polymer that will be produced by the first-stage polymerization can freely be predetermined. In general, however, the polymerization conditions are so decided that the MFR of the polymer will be from 0.1 to 3,000 g/10 min, preferably from 1 to 300 g/10 min by taking moldability into consideration.

There is no particular limitation on the proportion of the amount of the polymer produced by the first polymerization stage to that of the polymer finally produced. However, when the balance of rigidity and impact resistance is taken into consideration, it is preferable to make this proportion from 30 to 95% by weight, particularly from 50 to 93% by weight.

The average residence time in the first polymerization stage is controlled to 0.1 to 8 hours, preferably 0.5 to 5 hours, more preferably about 0.7 to 3.0 hours. The average residence time herein is a value obtainable by dividing the residence amount of the polymer in the first polymerization stage by the amount of the polymer delivered from the first polymerization stage to the second polymerization stage for unit time.

It is preferable that the mean CE of the polymer to be delivered to the second polymerization stage from the first polymerization stage be higher than a certain level. The CE herein represents catalytic efficiency, and means the amount of a polymer produced per unit weight of a solid catalyst. When the mean CE is low, not only the catalyst cost is increased, but also the finally obtained polymer contains a large amount of the catalyst residue, so that the polymer has impaired heat stability and weathering resistance. For preventing this, there are such manners that additives are added in increased amounts and that a deliming treatment is carried out. However, both of these manners increase the production cost, so that it cannot be said that they are favorable. Therefore, the above-described mean CE is preferably 20,000 g/g or more, more preferably 30,000 g/g or more.

Solid Catalyst Component Having Sharp Particle Diameter Distribution

We found that it is effective to use n-item in the Rosin-Rammler distribution as an index of the particle diameter distribution of the solid catalyst component. The Rosin- Rammler distribution is such a distribution that the weight-integrated distribution Rw fulfills the following equation:

$$R_W = 100 \, \exp\left[-(\ln 2)\left(\frac{D}{D_{50}}\right)^n\right] \quad (1)$$

wherein D represents a particle diameter, and D50 represents a 50 wt % mean particle diameter. The unit of Rw is % by weight.

In general, the particle diameter of the solid catalyst component is extremely small, so that it is difficult to directly determine this distribution. However, by utilizing the so-called replica rule that the shape of polymer particles produced by polymerization using a Ziegler-Natta catalyst is similar to that of the catalyst, it becomes possible to carry out the following measurement.

Namely, after polypropylene particles are obtained by a batch polymerization method, the particle diameter distribution of the polypropylene particles are obtained by using standard sieves. Subsequently, this distribution is plotted on Rosin-Rammler paper, and the slope of a line approximated by the plots is obtained. By this, the n-item of the polypropylene particles can be obtained. In this specification, the n-item thus obtained is defined as the n-item of a solid catalyst component.

Depending upon the catalyst used, there may be a case where it is difficult to obtain an approximated line by plotting, on Rosin-Rammler paper, the particle diameter distribution of the above-described polymer obtained by a batch polymerization method. In such a case, the slope of a line connecting the point of a 20 wt % mean particle diameter, D20, and the point of an 80 wt % mean particle diameter, D80, is taken as n-item.

To produce a propylene block copolymer according to the present invention, a solid catalyst component having an n-item of 5 or more, preferably 6 or more, more preferably 7 or more, and most preferably 8 or more is used. In the case where a solid catalyst component having an n-item of less than 5 is used, the short-pass-preventing effect of a classifier that is shown at the time when a polymer is transferred from the first stage to the second stage is decreased. Moreover, the proportion of particles having small particle diameters is increased as compared with the case where the n-item is great, so that operational troubles tend to be caused. For example, separation cannot be perfectly done by the classifier, and, at the same time, the amount of particles having small particle diameters separated is increased, so that the load applied to the process tends to be increased. Furthermore, a slurry rich in particles having small particle diameters is returned to the polymerization tank in the first stage, so that the particles having small particle diameters are accumulated in the polymerization tank in the first stage. As a result, such troubles tend to occur that the polymerization tank undergoes a substantial decrease in capacity and that it becomes impossible to continuously operate the polymerization tank for a long period of time. It is noted that, when so-called fines having particle diameters of less than 75, among those particles having small particle diameters, are existing in a large amount, the possibility that severer troubles will be brought about is increased. This is because such fines are scarcely transferred to the second polymerization stage from the classifier, so that they are accumulated in the first polymerization stage to increase the possibility of causing operational troubles such as clogging.

For avoiding such troubles, it is important that the level of the amount of the fines produced be extremely low. To attain this, the solid catalyst component is desired to have, in addition to a sharp particle diameter distribution, such a property that it gives fines in an extremely small amount.

One technique for attaining these desirable properties is a method using a solid catalyst component (A*) which can be obtained by bringing a halogen-containing titanium compound (b*) into contact with a reaction product (a*) obtained by reacting a magnesium alkoxide (a1), a titanium alkoxide (a2), a silicon alkoxide (a3), and, if necessary, an alcohol compound (a4), followed by heating; or a method using a compound obtained by subjecting the solid catalyst component (A*) to prepolymerization. The "alcohol compound" herein includes phenol compounds and silanol compounds in addition to alcohols. Processes for producing such solid catalyst components are shown in, for example, Japanese Patent Laid-Open Publications No. 98706/1977, No. 6204/1984, No. 182806/1984, No. 181807/1986, No. 54007/1989, No. 72503/1991, No. 89814/1992 and No. 89815/1992. Particularly preferred are those solid catalyst components which are obtained in the following manner.

Namely, compounds useful as the magnesium alkoxide compound (a1) are those ones which are represented by the following general formula:

$$Mg(OR^1)_n(OR^2)_{2-n} \quad (2)$$

wherein $R^1$ and $R^2$, which may be the same or different, represent an alkyl group (having approximately 1 to 18 carbon atoms, preferably about 1 to 12 carbon atoms), an aryl group (phenyl group or a lower-alkyl-substituted phenyl group being preferred), or an aralkyl group (whose aryl moiety is preferably one shown as the aryl group in the above and whose alkyl moiety is preferably one having approximately 1 to 8 carbon atoms), and n is a number from 0 to 2 inclusive; for instance, dialkoxymagnesiums such as dimethoxymagnesium, diethoxy-magnesium, diisopropoxymagnesium, di-n-butoxymagnesium, diphenoxy-magnesium, dibenzyloxy-magnesium and ethoxyphenoxymagnesium, diaryloxy-magnesiums and alkyloxyaryloxymagnesiums. These compounds can be used in combination.

Compounds useful as the titanium alkoxide compound (a2) are those ones which are represented by the following general formula:

$$Ti(OR^3)_{4-m}X_m \quad (3)$$

wherein $R^3$ represents an alkyl, aryl or aralkyl group (these groups are the same as those mentioned for the above-described magnesium alkoxides), X represents a halogen such as chlorine, and m is a number from 0 to 4 inclusive; for instance, alkoxytitaniums such as tetramethoxytitanium, tetraethoxytitanium, tetra-n-propoxytitanium, tetraisopropoxytitanium and tetra-n-butoxytitanium, and halogen-containing alkoxytitaniums such as triethoxytitanium chloride, triisopropoxytitanium chloride, tri-n-butoxytitanium chloride and di-n-butoxytitanium dichloride. These compounds can also be used in combination.

Compounds useful as the silicon alkoxide compound (a3) are those ones which are represented by the following general formula:

$$Q_pSiX_k(OR^4)_{4-p-k} \quad (4)$$

wherein Q and $R^4$, which may be the same or different, represent an alkyl, aryl or aralkyl group (these groups are the same as those mentioned for the above-described magnesium alkoxides), X represents a halogen such as chlorine, and p and k are numbers which fulfill the conditions of $0 \leq p$, $0 \leq k$, and $0 < p+k < 4$; for example, (a) alkyl- or aryl-groupcontaining alkoxy- or aryloxy-silanes such as methyltrimethoxysilane, methyltriethoxysilane, methyltri-n-butoxysilane, methyltriphenoxysilane, ethyltrimethoxysilane, ethyltriethoxy-silane, ethyltri-n-butoxysilane, ethyltriphenoxysilane, phenyltrimethoxysilane, phenyltriethoxysilane, phenyltri-n-butoxysilane, phenyltriphenoxysilane, dimethyldimethoxysilane, dimethyldiethoxysilane, dimethyldi-n-butoxysilane, dimethyldiphenoxysilane, diethyldimethoxysilane, diethyldiethoxysilane, diethyldi-n-butoxysilane, diethyldiphenoxysilane, diphenyldimethoxysilane, diphenyldiethoxysilane, diphenyldi-n-butoxysilane and diphenyldiphenoxysilane; and (b) alkyl-group-, aryl-group- or halogen-containing alkoxy- or aryloxy-silanes such as methyldimethoxychlorosilane, methodiethoxychlorosilane, methyldi-n-butoxychlorosilane, methyldiphenoxychlorosilane, phenyldimethoxychlorosilane, phenyldiethoxychlorosilane, phenyldi-n-butoxychlorosilane and phenyldiphenoxychlorosilane. Further, (c) $Si(OR^4)_4$ type alkoxy- or aryloxy-silanes such as tetramethoxysilane, tetraethoxysilane, tetra-n-butoxysilane and tetraphenoxy-silane; and (d) $SiX_k(OR^4)_{4-k}$ type halogen-containing alkoxy- or aryloxy-silanes such as trimethoxychlorosilane, triethoxychlorosilane, tripropoxychlorosilane, tri-n-butoxychlorosilane and triphenoxychlorosilane can also be suitably used. These compounds can also be used in combination.

Compounds useful as the alcohol compound (a4) that is used when necessary are those ones which are represented by the following general formula:

$$R^5OH \qquad (5)$$

wherein $R^5$ represents an alkyl, aryl or aralkyl group (these groups are the same as those mentioned for the above-described magnesium alkoxides, and may further contain ether oxygen or hydroxyl group); or by the following general formula:

$$R^6_3SiOH \qquad (6)$$

wherein $R^6$ represents an alkyl, aryl or aralkyl group (these groups are the same as those mentioned for the above $R^5$); for instance, alcohols such as methanol, ethanol, n-propanol, isopropyl alcohol, n-butanol, ethylene glycol, propylene glycol, cyclohexanol and benzyl alcohol, silanols such as trimethylsilanol and triphenylsilanol, and phenols such as phenol, cresol, xylenol and butyl phenol. These compounds can also be used in combination.

It is preferable that an aryloxy group be contained in either one of these compounds (a1) to (a4).

There is no particular limitation on the order in which the magnesium compound (a1), the titanium compound (a2), the silicon compound (a3), and, when necessary, the alcohol compound (a4) are brought into contact to obtain the product (a*). If desired, divided portions of these components can also be brought into contact. Further, an inert hydrocarbon solvent such as hexane, heptane, octane, nonane, decane, toluene or xylene may also be allowed to exist when these components are brought into contact. There is no particular limitation also on the contact temperature. However, it is generally from 10 to 250° C., preferably from 100 to 180° C. There is no particular limitation also on the contact time, and it is generally about 0.5 to 4 hours.

The amounts of the components (a1) to (a4) to be used are generally as follows when expressed in molar ratio:

(a1):(a2):(a3):(a4)=1:0.05–4:0.05–5:0–2:0–5

The reaction product (a*) of the components (a1) to (a4) may be either of a homogeneous system or of an unhomogeneous system. Namely, the reaction product (a*) will become liquid or solid depending upon the composition of the components (a1) to (a4). In the case where either one of the components (a1) to (a4) contains an aryloxy group, a reaction product in the state of a slurry containing solid substances tends to be obtained, and gives particularly excellent results.

In a preferred embodiment, an electron donor compound (c*) is brought into contact with this reaction product (a*) either before or after the reaction product (a*) is brought into contact with a halogen-containing titanium compound(b*). In the case where an electron donor compound (c*) is brought into contact with the reaction product (a*) before the reaction product (a*) is brought into contact with a halogen-containing titanium compound (b*), the contact may be conducted in the presence of an inert hydrocarbon solvent such as hexane, heptane, octane, nonane, decane, toluene or xylene. There is no particular limitation on the contact manner. In general, however, the contact is effected by adding (c*) to (a*). There is no particular limitation also on the contact temperature. However, the contact is generally conducted at a temperature ranging from –50 to 200° C., preferably from –40 to 50° C.

Further, there is no particular limitation also on the amount of (c*) to be used. However, the amount of (c*) to be generally used is as follows when expressed in molar ratio to magnesium contained in the reaction product (a*):

Mg:(c*)=1:0.01–2

As the electron donor compound (c*), oxygen-containing compounds such as ethers, ketones, esters and alkoxysilanes can generally be mentioned.

(a) Useful ethers are those ones in which the total number of carbon atoms contained in hydrocarbon residues combined with ether oxygen is approximately 2 to 18, preferably about 4 to 12, for example, diethyl ether, dipropyl ether, diethylene glycol dimethyl ether, propylene glycol dimethyl ether, ethylene oxide, tetrahydrofuran, 2,2,5,5-tetramethyltetrahydrofuran and dioxane. (b) Useful ketones are those ones in which the total number of carbon atoms contained in hydrocarbon residues combined with ketonic carbonyl group is approximately 2 to 18, preferably about 4 to 12, for example, acetone, diethyl ketone, methyl ethyl ketone and acetophenone. (c) Useful esters are those ones whose carboxylic acid moiety is an aryl or aralkyl carboxylic acid, the aryl moiety thereof being phenyl group which may be substituted with a lower alkyl or alkoxy group and which has 1 to 3 carboxylic acid groups. It is preferable that the number of carbon atoms contained in the alkyl moiety of the aralkyl carboxylic acid be from 1 to 6. Further, also in the case of an aliphatic carboxylic acid, the alkyl chain thereof may contain ether oxygen; and those aliphatic carboxylic acids which contain 1 to 20 carbon atoms, preferably 2 to 12 carbon atoms, and 1 to 3 carboxylic acid groups are preferred. The alcohol moieties of the esters contain 1 to 8 carbon atoms, preferably 1 to 4 carbon atoms, and the carbon chains of the esters may contain ether oxygen. Inner esters of hydroxy carboxylic acids corresponding to the above-described carboxylic acids, that is, lactones are also preferred. Some examples of these esters are as follows: ethyl phenylacetate, methyl benzoate, ethyl benzoate, phenyl benzoate, methyl toluate, ethyl toluate, methyl anisate, ethyl anisate, methyl methoxybenzoate, ethyl methoxybenzoate, methyl methacrylate, ethyl methacrylate, dimethyl phthalate, diethyl phthalate, dipropyl phthalate, dibutyl phthalate, diisobutyl phthalate, dihexyl phthalate, γ-butyrolactone and ethyl cellosolve. (d) Useful alkoxysilanes include those ones having at least one alkoxy group (having approximately 1 to 12 carbon atoms, especially about 1 to 4 carbon atoms, aryloxy groups being included), the other silicon valences being satisfied with alkyl, aryl or aralkyl groups (as the alkyl group, those ones having approximately 1 to 18 carbon atoms, especially about 1 to 12 atoms are preferred; as the aryl group, phenyl group and lower-alkyl-substituted phenyl groups are preferred; and as the aralkyl group, those ones whose aryl moiety is phenyl group or a lower-alkyl-substituted phenyl group and whose alkyl moiety contains approximately 1 to 18 carbon atoms, especially about 1 to 12 carbon atoms are preferred), such as tetramethoxysilane, ethyltrimethoxysilane, n-propyltri-methoxysilane, isopropyl-trimethoxysilane, t-butyl-trimethoxysilane, phenyltri-methoxysilane, cyclohexyl-trimethoxysilane, 1-methyl-cyclohexyltrimethoxysilane, 1,1,2,2-tetramethylpropyl-trimethoxysilane, diethyldimethoxysilane, di-n-propyl-dimethoxysilane, diisopropyldimethoxysilane, di-phenyl-dimethoxysilane, t-butylmethyldimethoxysilane, t-butylethyl-dimethoxysilane, t-butyl-n-propyldimethoxysilane, t-butylisopropyl-dimethoxysilane, cyclohexylmethyl-dimethoxysilane, dicyclohexyldimethoxysilane, 1-methyl-cyclohexyl-methyldimethoxysilane, 1,1,2,2-tetramethylpropylmethyl-dimethoxysilane, ethyltriethoxysilane, n-propyltri-ethoxysilane, isopropyltriethoxysilane, t-butyltriethoxy-silane, phenyltriethoxysilane, cyclohexyl-triethoxysilane, 1-methylcyclohexyltriethoxysilane, 1,1,2,2-tetramethylpropyl-triethoxysilane, diethyldiethoxysilane, di-n-propyldiethoxysilane, diisopropyl-diethoxysilane, diphenyldiethoxysilane, t-butylmethyldiethoxysilane, t-butylethyl-diethoxysilane, t-butyl-n-propyldiethoxysilane, cyclohexylmethyldiethoxysilane, cyclohexylethyldiethoxysilane, 1-methylcyclohexylmethyldiethoxysilane and 1,1,2,2-tetramethylpropylmethyl-diethoxysilane.

Of these compounds, esters and alkoxysilanes are preferably used, and esters are more preferred. Among esters, aryl carboxylic esters are more preferably used; and particularly preferred are phthalic esters, and the most preferred is diethyl phthalate.

After the reaction product (a*) and the electron donor compound (c*) are brought into contact with each other in the above-described manner, the product obtained by this contact is brought into contact with a halogen-containing titanium compound (b*), followed by treatment by raising the temperature. Thus, a solid catalyst component (A*) suitable for use in the present invention can be obtained.

Examples of the halogen-containing titanium compound (b*) for use herein include titanium tetrahalides such as TiCl$_4$, TiBr$_4$ and TiI$_4$, halogen-containing alkoxytitaniums such as Ti(O—n—C$_4$H$_9$)Cl$_3$ and Ti(OC$_6$H$_5$)Cl$_3$, and halogen-containing aryloxytitaniums. It is preferable that the number of carbon atoms contained in the alkyl moieties of these compounds be approximately 1 to 18, especially about 1 to 12. Further, it is preferable that the aryl group be a lower-alkyl-substituted phenyl group.

In the contact step, the use of an inert hydrocarbon solvent such as hexane, heptane, octane, nonane, decane, toluene or xylene is optional. However, in view of the production process, it is generally convenient to use a solvent having a relatively high boiling point such as toluene.

The contact is generally conducted at a temperature not higher than 20° C. Thecontact temperature is preferably from −80 to 10° C., and more preferably from −50 to 0° C. When the contact temperature is made as low as the above-described temperature, the contact product tends to be a homogeneous liquid. By raising the temperature of this homogeneous liquid by heating so as to precipitate solids, a solid catalyst component particularly excellent in particle properties can be obtained.

Further, in the case where the reaction product (a*) is brought into contact with the electron donor compound (c*) after the reaction product (a*) is brought into contact with the halogen-containing titanium compound (b*) and before solids are precipitated, the contact may be conducted in the following manner.

The contact between the component (a*) and the component (b*) can be conducted in the manner as mentioned above. Namely, the contact is generally effected at a temperature of 20° C. or lower, preferably from −80 to 10° C., more preferably from −50 to 0° C. As mentioned previously, when the contact temperature is made as low as the above-described temperature, the contact product tends to be a homogeneous liquid. Also as mentioned previously, although the use of an inert hydrocarbon solvent such as hexane, heptane, octane, nonane, decane, toluene or xylene is optional in the contact step, it is generally convenient to use a solvent having a relatively high boiling point such as toluene when the production process is taken into consideration. As the halogen-containing titanium compound (b*), titanium tetrahalides, and halogen-containing alkoxy- or aryloxy-titaniums which are the same as those mentioned before may be used.

Subsequently, the contact product thus obtained is brought into contact with the electron donor compound (c*) before solids are precipitated. When the temperature is high, solids tend to be precipitated. The contact is therefore conducted at a temperature of generally 20° C. or lower, preferably from −80 to 10° C., more preferably from −50 to 0° C.

By thus bringing the contact product and the electron donor compound (c*) into contact with each other before solids are precipitated, high stereoregularity can be attained.

There is no particular limitation on the amount of the halogen-containing titanium compound (b*) to be used irrespective of the manner in which the contact product and the electron donor compound (c*) are brought into contact with each other. In general, however, the molar ratio of the halogen-containing titanium compound (b*) to magnesium contained in the reaction product (a*) is in the following range:

Mg:(b*)=1:0.5–20

By bringing the components (a*), (b*) and (c*) into contact in the above-described manner, a solid catalyst component can be obtained. There can be mentioned, as a means for obtaining excellent powder properties, a method in which the temperature-raising rate is controlled.

Namely, it is preferable to make the temperature-raising rate generally 2.0° C./min or less, especially 1.0° C./min or less on the average until the temperature reaches 50° C. The heat-up is not necessarily conducted uniformly; a step in which the temperature becomes constant, or even cooling step may be provided while the temperature is raised. By making the average temperature-raising rate as low as the above-described one, it becomes possible to obtain a catalyst having particle properties excellent in bulk density, particle diameter distribution, and the amount of fines.

There is no particular limitation on the temperature at which a treatment is carried out after the temperature has been raised to 50° C. In general, however, it is better to obtain a solid catalyst component (A*) by carrying out the treatment at a temperature higher than 110° C. When the treatment temperature is made excessively high, unfavorable results such as lowering of activity are brought about. Therefore, the preferable temperature range is higher than 110° C. and 170° C. or lower.

The time to be spent for the above treatment is not limited. However, the treatment is generally carried out over a period of 0.5 to 12 hours. Further, the treatment with the halogen-containing titanium compound (b*) may be carried out twice or more. It is noted that the temperature-raising rate can freely be decided for the treatment of the second time onward.

The solids produced are washed with an inert hydrocarbon solvent such as hexane, heptane, octane, nonane, decane, toluene or xylene, thereby obtaining a slurry of the solid catalyst component (A*).

An example of a preferable combination of the components for obtaining a solid catalyst component (A*) which has excellent properties as an olefin polymerization catalyst is as follows:

(a1):$Mg(OR)_2$ (R: an alkyl or aryl group), (a2):$Ti(OR)_4$ (R: an alkyl group), (a3):$RSi(OR)_3$ (R: an aryl and/or alkyl group)+$Si(OR)_4$ (R: an alkyl group), (c*):diphthalate, and (b*):$TiCl_4$, provided that either (a1) or (a3) contains an aryloxy group.

An olefin polymer can be obtained by feeding the solid catalyst component (A*) to a reactor as it is. However, in order to obtain excellent powder properties, it is preferable to newly form a solid catalyst component by bringing the solid catalyst component (A*) into contact with an organoaluminum compound (B*) and an olefin (C*) in advance, that is, by subjecting these components to a prepolymerization treatment.

The organoaluminum compound (B*) for use herein may properly be selected from those organoaluminum compounds which have previously been mentioned as the component of the polymerization catalyst for producing block copolymers of the present invention. Specific examples of the organoaluminum compound (B*) include trialkylaluminums such as trimethylaluminum, triethylaluminum, tri-n-propylaluminum, triisobutylaluminum and trihexylaluminum; halogen-containing organoaluminum compounds such as diethylaluminum chloride and sesquialuminum chloride; hydride-containing organoaluminum compounds such as diethylaluminum hydride; alkoxide-containing organoaluminum compounds such as dimethylaluminum methoxide, diethylaluminum methoxide and diethylaluminum phenoxide; and aluminoxanes such as methylaluminoxane, ethylaluminoxane and isobutylaluminoxane. These compounds may be used in combination. It is common that the organoaluminum compound (B*) be used in such an amount that the atomic ratio of aluminum contained in the organoaluminum compound to titanium contained in the solid catalyst component (A*) will be from 0.1 to 100.

Further, any olefin containing carbon-carbon double bond, polymerizable by a Ziegler catalyst can be used as the olefin (C*). Specific examples of such olefins include α-olefins such as ethylene, propylene, 1-butene, 1-pentene, 1-hexene, 3-methyl-1-butene, 3-methyl-1-pentene, 4-methyl-1-pentene, vinylcyclohexane, styrene and divinylbenzene; and inner olefins such as 2-butene, 2-pentene, cyclopentene and cyclohexene. These olefins can be used either singly or as a mixture of two or more members. The amount of the olefin (C*) to be used is 0.1 to 1,000 times, preferably 0.5 to 300 times, more preferably 0.5 to 50 times, particularly 1 to 3 times the amount of the solid catalyst component (A*). At least a part of this olefin is polymerized to be a prepolymerized polymer in an amount of 0.1 to 1,000 times the amount of the solid catalyst component (A*).

This prepolymerization can suitably be carried out in an inert hydrocarbon solvent medium such as butane, pentane, hexane, heptane or toluene. Alternatively, it can also be carried out in the presence of substantially no solvent. From the viewpoints of removal of heat and feeding of the catalyst, it is preferable to effect the prepolymerization in an inert hydrocarbon solvent medium. In the prepolymerization, the components (A*), (B*) and (C*) can be brought into contact in any manner. Namely, they may be brought into contact either at one time or successively. Moreover, the contact can be repeated twice or more. The contact temperature is from −20 to 130° C., preferably from 0 to 70° C. Further, the contact may be conducted either batch-wise or continuously. Furthermore, the contact can also be conducted in the presence of an electron donor compound. The electron donor compound for use herein may properly be selected from those compounds which have previously been mentioned as the electron donor compound to be fed to a polymerization tank in the first polymerization stage.

<Classification of Polymer>

A classification system composed of a sedimentation liquid force classifier and a concentrator can be used as a means for preventing the short pass of particles having small particle diameters from the first polymerization stage to the second polymerization stage.

The liquid force classifier herein refers to an apparatus for separating polymer particles according to their particle diameters by bringing, in the apparatus, a slurry drawn out from the first polymerization stage into countercurrent contact with a classification medium, preferably the supernatant liquid of a low-concentration slurry obtained from the concentrator. Among the polymer particles which have been fed to this liquid force classifier, those particles having large particle diameters have a high probability that they sediment in the classifier against the countercurrent fluid. A slurry rich in the thus-sedimented particles having large particle diameters is drawn out from a drawing port at the bottom of the classifier, and delivered to the second polymerization stage. On the other hand, those particles having small particle diameters have a high probability that they go up along with the above-described countercurrent fluid. A slurry rich in these particles having small particle diameters are drawn out from the top of the classifier, and returned to the original polymerization tank to continue the polymerization. By this method, it also becomes possible to increase the unit of the catalyst.

It is preferable to use the liquid force classifier in combination with a slurry concentrator. In this case, a liquid cyclone, a centrifugal separator, a filter or the like is used as the concentrator. For continuous operation, a liquid cyclone is favorably used because it is excellent in operability, small in size and inexpensive, and also requires only a small installation area.

By properly selecting the operation conditions of the liquid cyclone, it is possible to separate a slurry into a supernatant liquid containing almost no particles, and a concentrated slurry. The use of the thus-obtained supernatant liquid containing almost no polymer particles as the countercurrent fluid in the classifier is advantageous because, in this case, it is possible to decrease the amount of the fluid for use in the process, and therefore to reduce the load that is applied to the process.

Whether the slurry drawn out from the first polymerization stage is firstly fed to the concentrator or to the sedimentation liquid force classifier can freely be decided. It is however advantageous to firstly feed the slurry to the sedimentation liquid force classifier. This is because the pressure loss is small in this case, so that a pump for feeding the slurry can be made small in size. Moreover, there is also such merit that the control range of flow rate of the supernatant liquid obtained from the concentrator can be made wide.

Among the polymer particles thus obtained from the first polymerization stage, a particle group rich in those particles having relatively large particle diameters, drawn out from the bottom of the sedimentation liquid force classifier is delivered to the second polymerization stage.

<Removal of Propylene from Polymer Slurry>

The above-described particle group is obtained as a slurry consisting of a polymer and liquid propylene. In the case where this slurry is fed, as it is, to a gaseous phase polymerization tank in the second polymerization stage, such unfavorable situations tend to be brought about that the temperature distribution in the gaseous phase polymerization tank becomes wide and that the ununiformity of flow condition of the polymer is increased. In order to avoid these situations, it is preferable to remove propylene from the slurry, and to feed only the polymer particles to the gaseous phase polymerization tank in the second polymerization stage. To remove propylene from the slurry, it is suitable to use, for example, a system composed of a double-pipe heat exchanger and a fluidized flash tank.

<Second Polymerization Stage>

In gaseous phase polymerization in the second polymerization stage, propylene and an α-olefin are copolymerized in the presence of the propylene polymer produced in the first polymerization stage, under the action of the stereoregular catalyst used in the first polymerization stage. A catalyst may newly be added to the second polymerization stage, if desired.

However, in order to prevent the formation of particles rich in a rubber-like component, it is preferable to conduct the second polymerization stage by utilizing substantially only the action of the stereoregular catalyst which has been used for the first polymerization stage.

Examples of α-olefins other than propylene, useful in the second polymerization stage include those ones preferably containing 2 to 12 carbon atoms, such as ethylene, 1-butene, 1-pentene and 1-hexene. Of these, ethylene and 1-butene are preferably used; and the most preferred is ethylene.

The concentration of propylene in the gaseous phase is generally less than 90 mol %, preferably 30 to 85 mol %. When the concentration of propylene in the gaseous phase is controlled to this range, the resulting block copolymer tends to have improved impact strength.

Further, as mentioned previously, in order to prevent the formation of particles containing a large amount of a rubber-like component, it is preferable to feed a certain compound which will act as a catalytic poison, for example, an active hydrogen compound, to the second polymerization stage. Examples of active hydrogen compounds include water, alcohols, phenols, carboxylic acids, sulfonic acids, and amines other than tertiary amines.

Examples of alcohols include aliphatic alcohols having approximately 1 to 12 carbon atoms, such as methanol, ethanol, n-propyl alcohol, i-propyl alcohol, n-butyl alcohol, n-hexyl alcohol, n-octyl alcohol, n-dodecanol, 2-ethylhexyl alcohol, cyclohexanol, ethylene glycol and propylene glycol. In addition, alcohols having ether oxygen, for example, methoxyethanol, ethoxyethanol and diethylene glycol can also be mentioned.

Examples of phenols include phenol, cresol, xylenol, t-butylphenol and 2,6-dimethyl-4-t-butylphenol.

Examples of carboxylic acids include those ones having approximately 1 to 12 carbon atoms, such as formic acid, acetic acid, propionic acid, butyric acid, stearic acid, acrylic acid, methacrylic acid, benzoic acid and salicylic acid.

Examples of sulfonic acids include methanesulfonic acid, ethanesulfonic acid, benzenesulfonic acid, toluenesulfonic acid and 4-ethylbenzenesulfonic acid.

Examples of amines other than tertiary amines include methylamine, ethylamine, n-propylamine, i-propylamine, n-butylamine, n-octylamine, cyclohexylamine, aniline, benzylamine, dimethylamine, diethylamine, di-n-propyl-amine, di-i-propyl-amine, di-n-butylamine, di-n-octylamine, dicyclohexylamine, diphenylamine and dibenzylamine.

These active hydrogen compounds can be used either singly or as a mixture of two or more members.

Of these active hydrogen compounds, preferred ones are those compounds which have relatively low boiling points and whose scents are not so strong. In particular, relatively-lower alcohols are preferred, and ethanol is the most preferred among them.

There is no particular limitation on the amount of the active hydrogen compound to be fed. It is however preferable to use the active hydrogen compound in such an amount that the molar ratio of the compound to aluminum contained in an organoaluminum compound that is fed to the second polymerization stage will be more than 1.0. In the case where the active hydrogen compound is fed in such an amount that the above-described molar ratio will be less than 1.0, the effect of improving impact resistance and fluidity of particles tends to become slightly smaller than the effect obtainable in the case where the above molar ratio is higher than 1.0.

With respect to the improvement of impact resistance, better results can be obtained when this molar ratio is higher. However, an excessively high molar ratio leads to remarkable lowering of polymerization activity for a rubber-like component, so that it is unfavorable from the viewpoint of productivity. Therefore, the preferable amount of the active hydrogen compound to be fed is such that the molar ratio of the compound to aluminum contained in an organoaluminum compound to be fed to the second polymerization stage is more than 1.0 and less than 3.0, more preferably 1.1 or more and 2.5 or less.

The active hydrogen compound can be fed in any manner. It may be fed after it is dissolved in a solvent such as n-hexane or toluene. Alternatively, it may also be directly fed without using any solvent.

Further, the active hydrogen compound can be fed at any position as long as it is possible to attain such a condition that the copolymerization of propylene and an α-olefin in the second polymerization stage is conducted in the presence of the active hydrogen compound.

Specifically, there can be mentioned a manner that the active hydrogen compound is fed from the lower part of a dispersion plate in a gaseous phase polymerization tank in the second polymerization stage; a manner that the active hydrogen compound is fed to a gas circulation line connected to the gaseous phase polymerization tank; a manner that the active hydrogen compound is fed to a bed layer consisting of polymer particles, formed in the gaseous phase polymerization tank; a manner that the active hydrogen compound is fed to the upper part of the bed layer; a manner that the active hydrogen compound is fed to a degassing tank provided between the first and second polymerization stages; and a manner that the active hydrogen compound is fed into a transfer pipe placed between the degassing tank and the gaseous phase polymerization tank in the second polymerization stage. The active hydrogen compound may be fed from only one position; and, if necessary, it may also be fed from two or more positions. Of the above-described manners, a manner that the active hydrogen compound is fed from the lower part of a dispersion plate in the gaseous phase polymerization tank is preferred in order to effectively disperse the active hydrogen compound.

The amount of a polymer that will be produced in the second polymerization stage can also be predetermined freely. In general, however, this amount is selected from a range of 5 to 70% by weight, preferably 7 to 50% by weight of the whole polymer by taking the balance of rigidity and impact resistance into consideration.

There are no particular limitations also on polymerization temperature, time and pressure. However, in the light of the aforementioned polymerization rate, the polymerization temperature is selected from the range of 0 to 100° C., preferably 25 to 90° C.; the polymerization time is selected from the range of 0.1 to 6 hours, preferably 0.5 to 3 hours; and the polymerization pressure is selected from the range of 0.1 to 100 atm, preferably from 1 to 40 atm.

The molecular weight of the copolymer to be produced in the second polymerization stage can freely be predetermined. In general, however, the weight-average molecular weight MW of the copolymer is controlled to 200,000 to 3,000,000, preferably 40,000 to 2,000,000 by taking the balance of physical properties and moldability into consideration. It is noted that hydrogen is generally used for controlling the molecular weight. The melt flow rate (MFR) of the block copolymer finally obtained varies depending on the molecular weight of the copolymer obtained in the second polymerization stage, and also on the proportion of this copolymer to the whole polymer. There is no particular limitation also on the range of this MFR. However, when moldability is taken into consideration, it is preferable to make the MFR generally from 0.01 to 3,000 g/10 min, particularly from 0.1 to 1,000 g/10 min (in accordance with JIS-K-6758).

Further, as mentioned previously, it is preferable that the mean CE of the block copolymer be higher than a certain level. When the mean CE is low, not only the catalyst cost is increased, but also the amount of the catalyst residue remaining in the polymer is increased. As a result, the polymer has impaired heat stability and weathering resistance. The mean CE is preferably 30,000g/g or more, more preferably 40,000g/g or more. Therefore, the amount of the solid catalyst component contained in the polymer is preferably not more than 1 g per $3 \times 10^4$ g of the polymer, more preferably not more than 1 g per $4 \times 10^4$ g of the polymer.

Any type of polymerization tank can be used for the gaseous phase polymerization in the second polymerization stage. A conventional fluidized bed, agitated fluidized bed or agitated tank, or the like can be used.

After these first and second polymerization stages, it is possible to successively conduct another polymerization. In this polymerization stage, polymerization in which the concentration of propylene in gaseous phase becomes, for example, less than 90 mol %, such as copolymerization of propylene and ethylene, homopolymerization of ethylene, or copolymerization of ethylene and another α-olefin can be carried out.

In the present invention, it is necessary to obtain the weight fraction of those particles whose rubber-like component contents are 50% by weight or more in the propylene block copolymer particles produced by the continuous polymerization process. There is no particular limitation on the method for obtaining this weight fraction, and the following methods can be exemplified.

A first method is such that the rubber-like component contents of the propylene block copolymer particles are directly obtained by a spectroscopic technique such as IR, pulse-NMR or the like. By this method, the weight fraction of those particles whose rubber-like component contents are 50% by weight or more can be obtained.

A second method is such that the polymer particles are fractionated by utilizing the difference between the density of the propylene polymer produced in the first polymerization stage and that of the rubber-like component polymer produced in the second polymerization stage. In general, the density of the rubber-like component is lower than that of the propylene polymer produced in the first polymerization stage, so that, when the proportion of the rubber-like component to the polymer particles is increased, the density of the particles is decreased. Therefore, if a proper solvent is used, the block copolymer particles can be fractionated according to the rubber-like component contents thereof. Besides the rubber-like component content, the volume of pores present in the particles can be mentioned as another factor that affects the density of the particles. It is a matter of course that the density of the particles is low when the volume of the pores is large. Therefore, this method is applicable only when the volume of the pores present in the particles is negligibly small, or when the volume of the pores present in the particles has already been known.

A third method is one using a reaction model of polymerization process. If the kinetic data of the polymerization catalyst, and the residence time distribution function of the catalyst in a polymerization tank have been known, the rubber-like component contents of the block copolymer particles and the distribution thereof can be calculated from the operational conditions for the process.

The propylene block copolymer according to the present invention is produced by a continuous polymerization method. Therefore, the rubber-like component contents of the polymer particles discharged from a polymerization system are distributed from values which are lower than the mean value to values which are higher than the same. In general, those polymer particles whose rubber-like component contents are lower than the mean value are 20% by weight or more of the whole polymer particles. Preferably, those polymer particles whose rubber-like component contents are lower than the mean value are 30% by weight or more of the whole polymer particles. Those polymer particles whose rubber-like component contents are lower than the mean value are generally 90% by weight or less, preferably 80% by weight or less of the whole polymer particles. Further, ⅓ or more by weight of these polymer particles having rubber-like component contents lower than the mean value are generally polymer particles whose rubber-like component contents are 0.5 times the mean value or more. Those polymer particles whose rubber-like component contents are less than 0.5 times the mean value are also present in an amount of generally 1.0% by weight or more, preferably 3.0% by weight or more of the whole polymer particles. Further, polymer particles having rubber-like component contents higher than the mean value are generally 20% by weight or more and preferably 50% by weight or less, more preferably 40% by weight or less of the whole polymer particles. Furthermore, ⅓ or more by weight of these polymer particles having rubber-like component contents higher than the mean value are generally polymer particles whose rubber-like component contents are 1.5 times the mean value or less.

EXAMPLES

The following examples are given for more specifically illustrating the present invention, but are not intended to be limiting the scope of the present invention.

Measurement of Physical Properties

The rubber-like component content was measured by a temperature-raising elution fractionation method using a temperature-raising elution fractionating apparatus "CFC-T-102L" manufactured by Mitsubishi Chemical Corp., Japan, under the conditions shown in Table 1. It is noted that a component which was eluted at a temperature of 40° C. or lower was taken as the rubber-like component.

The bulk density ($\rho B$) was measured in accordance with JIS-K-6721.

The particle diameter distribution of a polymer was determined in the following manner: the particle diameters were measured by using standard sieves manufactured by Mitamura Riken Co., Ltd., Japan, and plotted on Rosin-Rammler paper; and the slope of the plots was taken as n-item, and used as a measure of particle diameter distribution. The MFR was measured in accordance with JIS-K-6758.

TABLE 1

Conditions for Measurement by CFC

| Items | Conditions |
|---|---|
| Sample concentration | 2.0 mg/ml |
| Solvent (flow rate) | Ortho-dichlorobenzene (1.0 ml/min) |
| Column size | 0.46 mmØ × 15 cm |
| Filler | Glass (0.1 mmØ) |
| Temperature-lowering rate | 1.0° C./min |
| Temperature-raising rate | 1.0° C./min |
| Amount injected | 0.5 ml |
| GPC column | TSK GMHXL-HT (8 mm × 30 cm) × 3 |
| Temperature at GPC measurement | 135° C. |
| Detector | IR (MIRAN IA) |
| Wavelength at measurement | 3.42 μm |
| Calculation of molecular weight | Calculated in terms of PP |

The physical properties of a propylene block copolymer were measured in the following manner.

To 100 parts by weight of a polymer were added 0.075 parts by weight of a phenol-based antioxidant "Irganox 1010" manufactured by CIBA-GEIGY AG, 0.03 parts by weight of a phosphorus-based thermal stabilizer "Irgafos 168" manufactured by CIBA-GEIGY AG, 0.075 parts by weight of calcium stearate serving as a lubricant, manufactured by NOF CORPORATION, Japan, and 0.3 parts by weight of talc serving as a nucleating agent, and the mixture was mixed by a Henschel mixer to obtain a sample. Subsequently, this sample was introduced into a 40 mmφ extruder manufactured by Osaka Seiki Co., Ltd., Japan through a hopper sealed by nitrogen gas, and extruded at a temperature of 220° C. and a screw speed of 100 rpm, thereby pelletizing the sample.

Specimens for the measurements of physical properties were made by injection-molding the above-obtained pellets by the use of an injection-molding machine, Model N70BII manufactured by The Japan Steel Works Co., Ltd., Japan, at a plasticizing cylinder temperature of 220° C. and a metal mold temperature of 20° C. After this injection molding, the specimens obtained were allowed to stand in a thermostatic chamber at 23° C. for 4 to 7 days, and then subjected to the measurements of flexural modulus, Izod impact strength and surface impact strength.

The flexural modulus was measured in accordance with JIS-K-7203, at a temperature of 23±1° C.

The Izod impact strength was measured in accordance with JIS-K-7110, at a temperature of 23±1° C.

The surface impact strength which can be a measure of low-temperature impact resistance was measured in the following manner. An injection-molded piece of 38 mmφ × 2.0 mm was used as a specimen. On this specimen held at −30° C., an impactor whose tip had a curvature radius of ½ inches was placed vertically. A weight was dropped on this impactor to measure the fractural energy. It is noted that the measurement was carried out by using four specimens for one measurement point and that the minimum energy with which two out of the four specimens were fractured was taken as surface impact strength.

Further, a part of the pellets obtained were molded into a film having a thickness of 30 μm by the use of an extruder with a T-shaped die, and the number of gels having diameters of 0.05 mm or more present in 250 cm$^2$ of the film were counted.

The following method was used for obtaining the weight fraction of polymer particles whose rubber-like component contents are X % by weight or more.

In order to confirm whether a fractionation method using a solvent can be used, the density of so-called propylene homopolymer particles containing no rubber-like component was firstly measured. By this, the volume of pores existing in the polymer particles was confirmed to be negligible. This means that the density of polymer particles can be determined by the true density of the propylene homopolymer particles, the true density of the rubber-like component, and the content of the rubber-like component. Of these, the true density of the propylene homopolymer and that of the rubber-like component are already known, so that the rubber-like component content can be determined by the density of the particles.

The fractionation method using a solvent will be described hereinafter.

First of all, several solvent mixtures of cyclohexane and cyclohexanone with various mixing ratios were prepared. Regarding each solvent mixture, the relationship between temperature and density was determined. Next, the density of a polymer whose rubber-like component content had been known was obtained from the sink-and-float boundary point in the above-described solvent mixture, and the relationship between rubber-like component content and density was determined. From these results, the density at which the rubber-like component content was equal to X % by weight was obtained by calculation. Thereafter, a solvent mixture having the same density as the above-obtained density was prepared, and from 50 to 100 g of polymer particles to be measured were added to this solvent mixture. The resulting mixture was thoroughly stirred, and then allowed to stand still for 30 minutes. Only a part which was floating in the mixture was then separated, and weighed, whereby the weight fraction of those polymer particles whose rubber-like component contents were X % or more was obtained by calculation.

In the following examples, Me, Et, Bu and Ph represent methyl group, ethyl group, n-butyl group and phenyl group, respectively.

Example 1

(1) Preparation of Solid Catalyst Component (A)

In a 3 litter four-necked round flask equipped with a vacuum stirrer and a thermometer, 2.058 mol of $Mg(OEt)_2$ was placed. $Ti(OBu)_4$ was then placed so that the molar ratio of $Ti(OBu)_4$ to magnesium contained in the $Mg(OEt)_2$ ($Ti(OBu)_4/Mg$) would be 0.60. With stirring this mixture at 300 rpm, the temperature of the mixture was raised to 150° C.

After reacting the above two compounds at 150° C. for 1.5 hours, the temperature of the reaction mixture was lowered to 120° C. To this was added a toluene solution of $MeSi(OPh)_3$ so that the molar ratio of $MeSi(OPh)_3$ to magnesium contained in the $Mg(OEt)_2$ ($MeSi(OPh)_3/Mg$) would be 0.67. After the addition was completed, reaction was carried out at the temperature for 1 hour. The temperature of the reaction mixture was lowered to room temperature, and $Si(OEt)_4$ was then added to the mixture so that the molar ratio of $Si(OEt)_4$ to magnesium contained in the $Mg(OEt)_2$ ($Si(OEt)_4/Mg$) would be 0.05, thereby obtaining a slurry of the reaction product (a*).

The whole amount of the slurry obtained was transferred to a 10 litter induction-stirring-type autoclave with a jacket for cooling/heating, and then diluted with toluene so that the magnesium concentration would be 0.60 mmol per 1 litter of toluene.

With stirring at 300 rpm, this slurry was cooled to −10° C. Diethylphthalate was then added to the slurry so that the molar ratio of diethylphthalate to magnesium contained in the $Mg(OEt)_2$ (diethylphthalate/Mg) would be 0.10. Subsequently, $TiCl_4$ was added dropwise to the mixture over a period of 1.2 hours so that the molar ratio of $TiCl_4$ to magnesium contained in the $Mg(OEt)_2$ ($TiCl_4/Mg$) would be 4.0, thereby obtaining a homogeneous solution. During this operation, such a phenomenon that the solution underwent an increase in viscosity and was gelled was not observed.

The temperature of the homogeneous solution obtained was raised to 15° C. at a rate of 0.5° C./min, and the solution was held at the temperature for 1 hour. Subsequently, the temperature of the solution was raised again to 50° C. at a rate of 0.5° C./min, and the solution was held at 50° C. for 1 hour. The temperature of the solution was then further raised to 117° C. at a rate of 1.0° C./min, and the solution was held at the temperature for 1 hour.

The slurry produced was allowed to stand still, and the supernatant liquid was removed. Thereafter, the residue was washed with toluene so that the residue/toluene ratio would be 1/55.

The amount of the toluene contained in the slurry obtained was so adjusted that the concentration of the $TiCl_4$ would be 2.0 mol per 1 litter of toluene, and then $TiCl_4$ was added to the slurry at room temperature so that the molar ratio of $TiCl_4$ to magnesium contained in the initially placed $Mg(OEt)_2$ ($TiCl_4/Mg$) would be 5.0. The temperature of the slurry was raised with stirring the slurry at 300 rpm, and the slurry was held at 117° C. for 1 hour.

The slurry was allowed to stand still, and the supernatant liquid was removed. The residue was then washed with toluene so that the residue/toluene ratio would be 1/150.

250 g of the solid catalyst component (A*) thus obtained was transferred to a reaction tank having an inner diameter of 660 mm, with a cylindrical body whose length was 770 mm, equipped with a three-way sweep back wing, and diluted with n-hexane to make the concentration of (A*) 3 g/litter. With stirring at 300 rpm, triethylaluminum was added to the slurry at 25° C. in such an amount that triethylaluminum would be 3.44 mmol per 1 g of the solid catalyst component (A*). To this was further added t-butylethyldimethoxysilane in an amount of 1.44 mmol per 1 g of the solid catalyst component (A*). After the addition was completed, the mixture was held at 25° C. for 30 minutes with stirring. Subsequently, propylene gas was fed to the liquid phase for 72 minutes. After the feeding of propylene gas was discontinued, the mixture was washed with n-hexane by a sedimentation washing method so that the residue/n-hexane ratio would be 1/12, thereby obtaining a slurry of the solid catalyst component (A). The solid catalyst component (A) obtained was found to contain 2.7 g of propylene polymer per 1 g of the component (A*).

(2) Determination of Particle Diameter Distribution

In an induction-stirring-type 2 litter autoclave, 2.7 mmol of triethyl- aluminum and 0.05 mmol of t-butyl-n-propyldimethoxysilane were placed at room temperature under a stream of nitrogen gas. Subsequently, 750 g of liquid propylene was placed, and hydrogen was then added to the mixture so that the concentration of hydrogen in the gaseous phase at 70° C. would be 11.0 mol %.

The temperature of the mixture was raised to 70° C. with stirring. When the temperature of the mixture reached 70° C., 10.6 mg of the solid catalyst component obtained in Example 1 (1) was added to the mixture as the component (A*) to initiate polymerization.

Polymerization was conducted at 70° C. for 1 hour, and excessive propylene was then discharged to terminate the polymerization. The propylene polymer obtained was 478 g. Polymerization activity K was 1,500 g/g.hr.atm; ρB was 0.49 g/cc; and n was 11.2. No fines were found.

It is noted that the polymerization activity K is an yield (g) of the polymer per 1 g of the component (A*) for 1 hour under a monomer pressure of 1 atom.

(3) Preparation of Propylene Block Copolymer

Figure 1:
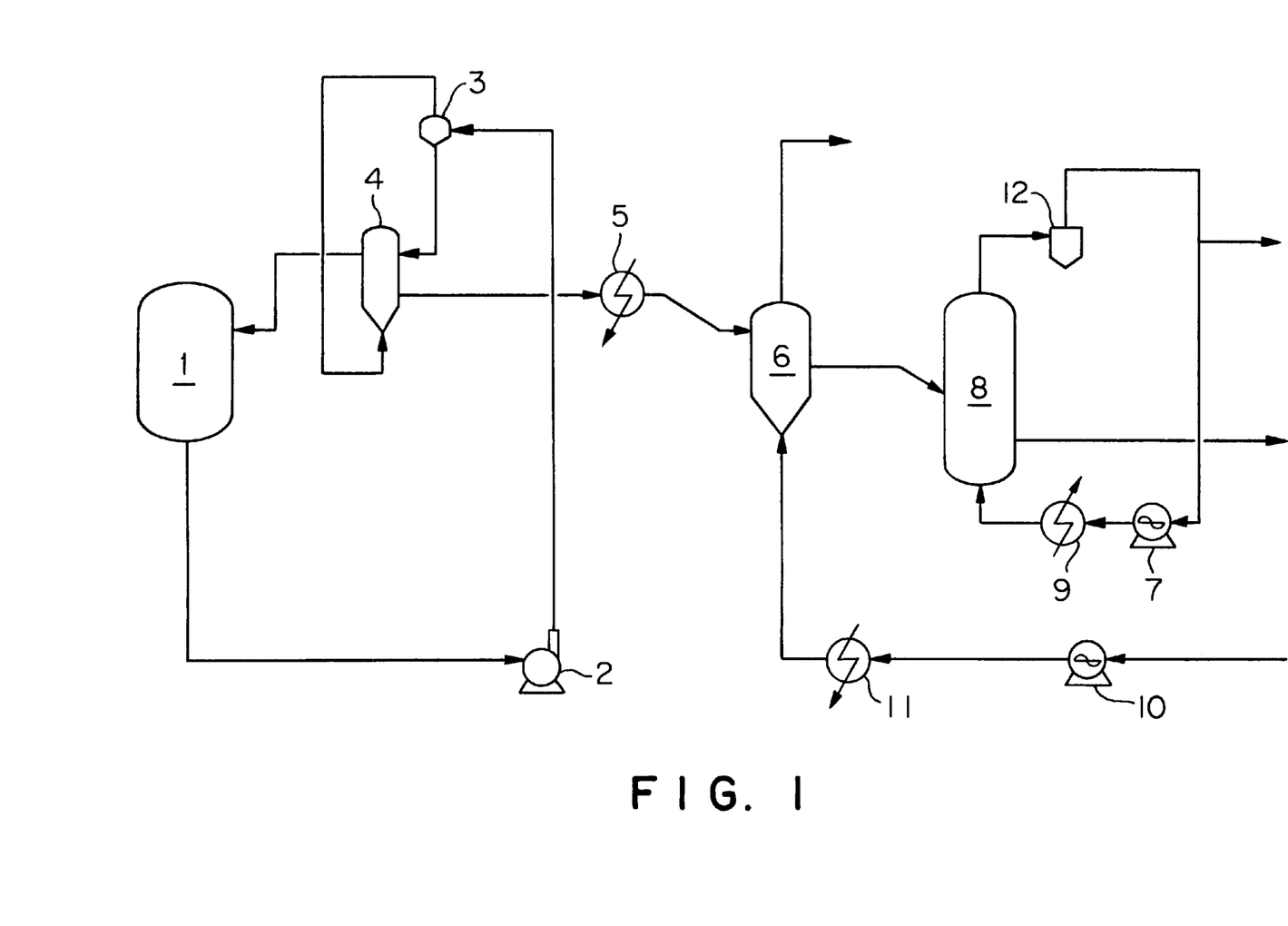
FIG. 1 is a flow diagram showing one embodiment of the process for producing a copolymer of the present invention.

Propylene polymer was continuously produced by using a process shown in FIG. 1, in which a classification system composed of a concentrator 3 (liquid cyclone) and a sedimentation liquid force classifier 4, and a degassing system composed of a double-pipe heat exchanger 5 and a fluidized flash tank 6 were placed between a liquid phase polymerization tank 1 having an internal volume of 0.85 m³, equipped with an agitator, and an agitated gaseous phase polymerization tank 8 having an internal volume of 1.9 m³.

To the propylene polymerization tank 1, liquid propylene was fed at a rate of 85 g/hr, and hydrogen was fed so that the concentration of hydrogen in the gaseous phase would be 8.5 mol %. Triethylaluminum and t-butylethyl-dimethoxysilane were also fed at rates of 35.7 g/hr and 1.0 g/hr, respectively. Further, the above-obtained solid catalyst component was fed as the component (A*) at a rate of 0.53 g/hr.

The polymerization temperature was 70° C.; the total pressure was 32.7 kgf/cm²; the partial pressure of propylene was 28 kgf/cm²; and the amount of the fluid in the polymerization tank was adjusted to 0.5 m³.

The concentration of the slurry contained in this polymerization tank was 25% by weight. The slurry was fed to the concentrator 3 by the use of a slurry pump 2 at a rate of approximately 12 m³/hr. From the top of the concentrator 3, the supernatant liquid containing almost no solid particles was taken out, and fed to the liquid force classifier 4 from the bottom thereof at a linear velocity of 4.0 cm/sec. The flow rate was approximately 2 m³/hr. On the other hand, the concentrated slurry drawn out from the bottom of the concentrator 3 was fed, as it was, to the liquid force classifier 4 from the top thereof at a rate of approximately 10 m³/hr. This slurry was thus brought into countercurrent contact with the above-described supernatant liquid.

Fine particles were contained in the slurry drawn out from the top of the liquid force classifier 4, so that the slurry was circulated to the original propylene polymerization tank 1. From the bottom of the classifier 4, a slurry with a concentration of approximately 30% by weight, rich in particles having large particle diameters was drawn out. The rate of drawing of this slurry was so adjusted that 25 kg of the polypropylene particles contained in the slurry would be drawn out for 1 hour.

The average residence time of the polypropylene drawn out from the bottom of the liquid force classifier 4, in the propylene polymerization tank land circulation line was 2.6 hours, and the polymerization activity K was found to be 850 g/g.hr. atm.

The slurry drawn out from the bottom of the liquid force classifier 4 was fed to the fluidized flash tank 6 through the counter-flow-type double-pipe heat exchanger 5, thereby degassing the slurry. It is noted that the inside temperature of the fluidized flash tank 6 was maintained at 70° C. by feeding heated propylene gas to the fluidized flash tank 6 from the bottom thereof.

The solid polypropylene particles obtained in the fluidized flash tank 6 were transferred to the gaseous phase polymerization tank 8, in which propylene and ethylene were copolymerized.

In the gaseous phase polymerization tank 8 having auxiliary agitating blades which had been provided in order to enhance mixing effect, a mixed gas consisting of ethylene, propylene, hydrogen and nitrogen was circulated by a gas blower 7. Ethylene and propylene were so fed that the total of the partial pressure of ethylene and that of propylene would be constant at 13.2 kgf/cm$^2$ and that the molar fraction of propylene would be constant at 55 mol %. Further, hydrogen was fed so that the concentration of hydrogen would be 2.5 mol %. The polymerization temperature was 60° C.; and the average residence time in the gaseous phase polymerization tank was adjusted to 1.3 hours.

Further, ethanol was fed as the active hydrogen compound so that the molar ratio of ethanol to aluminum contained in triethylaluminum to be fed to the gaseous phase polymerization tank along with the polymer particles would be 2.0.

The results of analysis and physical properties of the copolymer particles drawn out from the gaseous phase polymerization tank 8 are shown in Table 2. It is noted that the mean CE of this copolymer was found to be 71,950 (g/g).

Example 2

The same polymerization system as in Example 1 was used.

To the propylene polymerization tank 1, liquid propylene was fed at a rate of 115 kg/hr, and hydrogen was fed so that the concentration of hydrogen in the gaseous phase would be 8.5 mol %. Triethylaluminum and t-butylethyldimethoxysilane were also fed at rates of 30.6 g/hr and 1.32 g/hr, respectively. Further, the prepolymerized solid catalyst component obtained in Example 1 was added as the component (A*) at a rate of 0.85 g/hr.

The polymerization temperature was 70° C.; the total pressure was 32.7 kgf/cm$^2$; the partial pressure of propylene was 28 kgf cm$^2$; and the amount of the fluid in the polymerization tank was adjusted to 0.5 m$^3$.

The concentration of the slurry contained in this polymerization tank was approximately 25% by weight. The slurry was fed to the concentrator 3 by the slurry pump 2 at a rate of approximately 12 m$^3$/hr. The supernatant liquid containing almost no solid particles was drawn out from the top of the concentrator 3 at a rate of approximately 2.0 m$^3$/hr, and fed to the liquid force classifier 4 from the bottom thereof at a linear speed of 4.0 cm/sec.

On the other hand, the concentrated slurry drawn out from the bottom of the concentrator 3 was fed, as it was, to the liquid force classifier 4 from the top thereof at a rate of approximately 10 m$^3$/hr, thereby bringing this slurry into countercurrent contact with the above-described supernatant liquid. Fine particles were contained in the slurry drawn out from the top of the liquid force classifier 4, so that the slurry was circulated to the original propylene polymerization tank 1. From the bottom of the classifier 4, a slurry with a concentration of approximately 30% by weight, rich in particles having large particle diameters was drawn out so that 35 kg of the polypropylene particles contained in the slurry would be drawn out for 1 hour.

The average residence time of the polypropylene drawn out from the bottom of the liquid force classifier 4, in the propylene polymerization tank 1 and circulation line was 1.8 hours. The polymerization activity K was found to be 800 g/g.hr.atm.

Like in Example 1, the slurry drawn out from the bottom of the liquid force classifier 4 was fed to the fluidized flash tank 6 through the counter-flow-type double-pipe heat exchanger 5, and degassed at 70° C.

The solid polypropylene particles obtained were transferred to the gaseous phase polymerization tank 8, in which propylene and ethylene were copolymerized.

In the gaseous phase polymerization tank 8, a mixed gas consisting of ethylene, propylene, hydrogen and nitrogen was circulated by the gas blower 7. Ethylene and propylene were so fed that the total of the partial pressure of ethylene and that of propylene would be constant at 14.1 kgf/cm$^2$ and that the molar fraction of propylene would be constant at 55 mol %. Further, hydrogen was fed so that the concentration of hydrogen would be 2.3 mol %. The polymerization temperature was 70° C.; and the average residence time in the gaseous phase polymerization tank was adjusted to 2.2 hours.

In addition, ethanol was fed as the active hydrogen compound so that the molar ratio of ethanol to aluminum contained in triethylaluminum to be fed to the gaseous phase polymerization tank along with the polymer particles would be 1.4.

The results of analysis and physical properties of the polymer particles drawn out from the gaseous phase polymerization tank 8 are shown in Table 2. It is noted that the mean CE of this copolymer was found to be 50,020 (g/g).

Example 3

Polymerization was conducted in the same manner as in Example 1 except that the amount of ethanol to be fed to the gaseous phase polymerization tank 8 was changed to such an amount that the molar ratio of ethanol to aluminum contained in triethylaluminum to be fed to the gaseous phase polymerization tank along with the polymer particles would be 1.1 and that the average residence time in the gaseous phase polymerization tank was changed to 0.7 hours.

The results of analysis and physical properties of the polymer particles drawn out from the gaseous phase polymerization tank 8 are shown in Table 2. It is noted that the mean CE of this copolymer was found to be 47,490 (g/g).

Comparative Example 1

A block copolymer was obtained in the same manner as in Example 1 except that ethanol was not fed to the gaseous phase polymerization tank.

The results of analysis and physical properties of the polymer particles drawn out from the gaseous phase polymerization tank 8 are shown in Table 2.

Comparative Example 2

Figure 2:
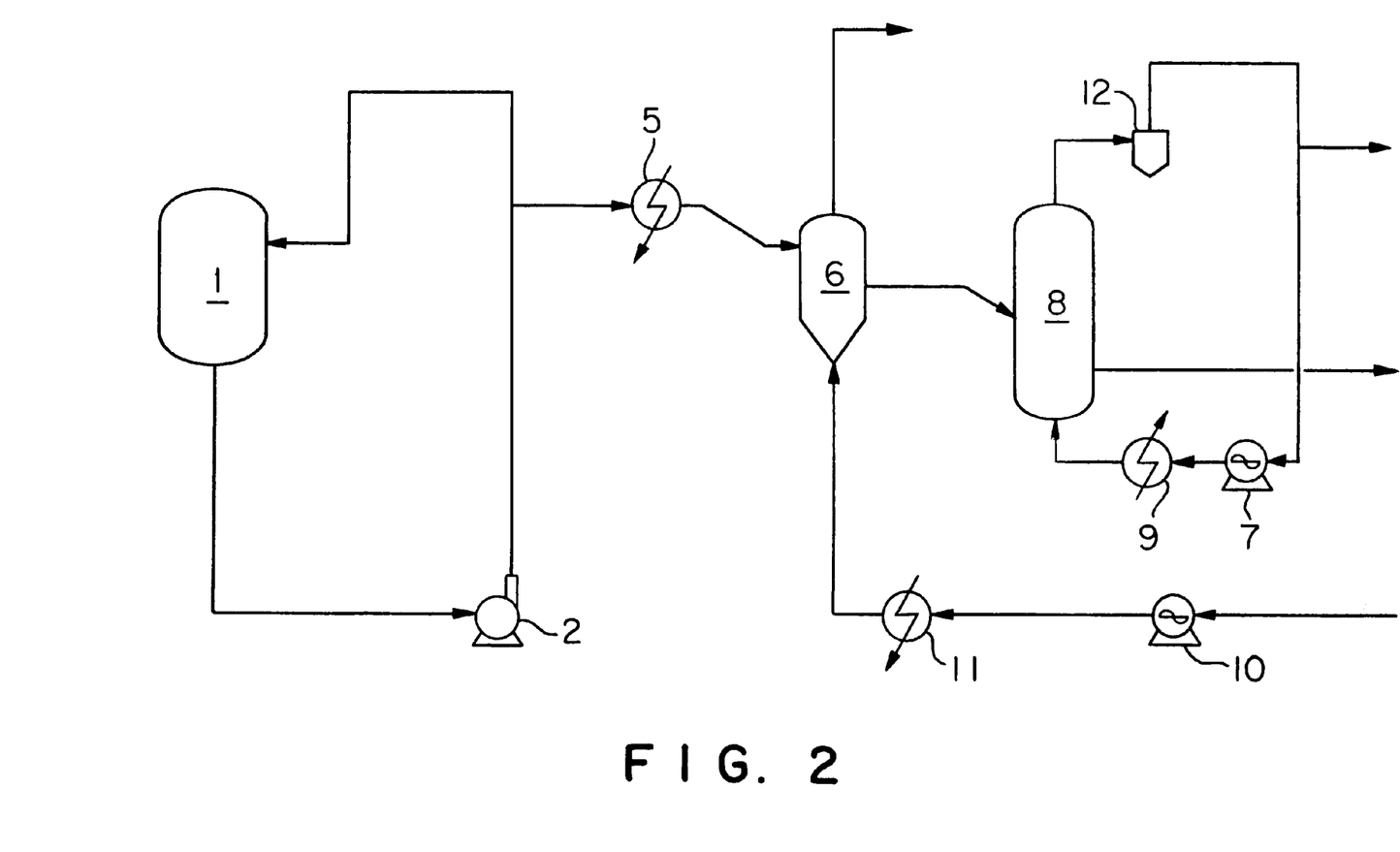
FIG. 2 is a flow diagram of the system used in Comparative Example 2.

A propylene block copolymer was continuously produced by a process shown in FIG. 2, in which a degassing system composed of a double-pipe heat exchanger 5 and a fluidized flash tank 6 was placed between a liquid phase polymerization tank 1 having an internal volume of 0.85 m$^3$, equipped with an agitator, and an agitated gaseous phase polymerization tank 8 having an internal volume of 1.9 m$^3$.

To the polymerization tank 1, liquid propylene was fed at a rate of 146 kg/hr, and hydrogen was so fed that the concentration of hydrogen in the gaseous phase would be 5.8 mol %. Triethylaluminum and t-butylethyldimethoxysilane were also fed at rates of 18.0 g/hr and 1.4 g/hr, respectively. Further, the prepolymerized solid catalyst component obtained in Example 1 was fed as the component (A*) at a rate of 1.16 g/hr.

The polymerization temperature was 70° C.; the total pressure was 31.5 kgf/cm$^2$; the partial pressure of propylene was 28 kgf/cm$^2$; and the amount of the fluid contained in the polymerization tank was adjusted to 0.5 m$^3$.

The concentration of the slurry contained in this polymerization tank was approximately 20% by weight. The average residence time of the polypropylene in the propylene polymerization tank 1 and circulation line was 2.2 hours. The catalyst activity K was found to be 350 g/g.hr.atm.

The slurry was drawn out so that 30 kg of the polypropylene would be drawn out for 1 hour, and fed, like in Example 1, to the fluidized flash tank 6 through the counter-flow-type double-pipe heat exchanger 5, followed by degassing at 70° C.

The solid polypropylene particles obtained were transferred to the gaseous phase polymerization tank 8, in which propylene and ethylene were copolymerized.

In the gaseous phase polymerization tank 8 having auxiliary agitating blades which had been provided in order to enhance mixing effect, a mixed gas consisting of ethylene, propylene, hydrogen and nitrogen was circulated by a gas blower 7. Ethylene and propylene were so fed that the total of the partial pressure of ethylene and that of propylene would be constant at 10.2 kgf/cm$^2$ and that the molar fraction of propylene would be constant at 55 mol %. Further, hydrogen was fed so that the concentration of hydrogen would be 2.5 mol %. The polymerization temperature was 60° C.; and the average residence time in the gaseous phase polymerization tank was adjusted to 2.5 hours.

In addition, ethanol was fed as the active hydrogen compound so that the molar ratio of ethanol to aluminum contained in triethylaluminum to be fed to the gaseous phase polymerization tank along with the polymer particles would be 2.0.

The results of analysis and physical properties of the copolymer particles drawn out from the gaseous phase polymerization tank 8 are shown in Table 2.

Comparative Example 3

A block copolymer was obtained in the same manner as in Comparative Example 2 except that ethanol was not added to the gaseous phase polymerization tank.

The results of analysis and physical properties of the polymer particles drawn out from the gaseous phase polymerization tank 8 are shown in table 2.

TABLE 2

|  |  | Example 1 | Example 2 | Example 3 | Comparative Example 1 | Comparative Example 2 | Comparative Example 3 |
|---|---|---|---|---|---|---|---|
| Distribution of Rubber-like Component Contents of Polymer particles (wt. %) | Mean Value | 14.0 | 19.4 | 15.1 | 14.4 | 18.5 | 18.5 |
|  | Below mean Value | 67 | 51 | 56 | — | — | — |
|  | Less than 0.5 times the mean value | 4 | 21 | 32 | — | — | — |
|  | Mean value - less than 1.5 times the mean value | 33 | 30 | 21 | — | — | — |
|  | 50 wt. % or more | <0.01 | <0.01 | 0.5 | 1.5 | 6.1 | 15.3 |
| Physical properties | MFR (g/10 min) | 31.8 | 22.0 | 30.1 | 37.4 | 23.5 | 32.0 |
|  | Bulk density (g/cc) | 0.463 | 0.450 | 0.422 | 0.390 | 0.420 | 0.390 |
|  | Flexural modulus (kg/cm$^w$) | 15400 | 13200 | 14200 | 14500 | 12000 | 12200 |
|  | Izod (kg · cm/cm) | 9.7 | 12.0 | 9.8 | 7.7 | 11.1 | 9.7 |
|  | Surface impact strength (kg · cm) | 95 | 165 | 90 | 48 | 55 | 68 |
|  | Gel content (pieces/250 cm$^2$) | 139 | 62 | 530 | 902 | >10$^4$ | >10$^4$ |
|  | Balance of rigidity and impact strength | good | good | good | poor | poor | poor |

What is claimed is:

1. A propylene block copolymer produced by continuous polymerization method, comprising polymer particles, said polymer particles having rubber component of an α-olefin having 2 to 18 carbon atoms, and content of said rubber component being 50% by weight or more, wherein the amount of said polymer particles is less than 1.0% by weight of the whole polymer particles finally discharged from a polymerization system.

2. The propylene block copolymer according to claim 1, wherein the proportion of those polymer particles whose rubber component contents are lower than the mean rubber component content of the polymer is 20% by weight or more of the whole polymer particles.

3. The propylene block copolymer according to claim 2, wherein the proportion of the polymer particles whose rubber component contents are lower than the mean rubber component content of the polymer is 30% by weight or more of the whole polymer particles.

4. The propylene block copolymer according to claim 1 or 2, wherein ⅓ or more of the polymer particles whose rubber component contents are lower than the mean rubber component content of the polymer have rubber component contents of 0.5 times the mean rubber component content or more.

5. The propylene block copolymer according to claim 1 or 2, wherein the proportion of those polymer particles whose rubber component contents are higher than the mean rubber component content of the polymer is 20% by weight or more of the whole polymer particles, and ⅓ or more of these polymer particles have rubber component contents of 1.5 times the mean value or less.

6. The propylene block copolymer according to claim 1 or 2, wherein those polymer particles whose rubber component contents are less than 0.5 times the mean rubber component content of the polymer are present in an amount of 1.0% by weight or more of the whole polymer particles.

7. The propylene block copolymer according to claim 1, containing a solid catalyst component in an amount not more than 1 g per $3 \times 10^4$ g of the polymer.

8. The propylene block copolymer according to claim 7, wherein the solid catalyst comprises magnesium, titanium and a halogen.

9. The propylene block copolymer according to claim 1, which is a copolymer of propylene and an α-olefin other than propylene.

10. The propylene block copolymer according to claim 1, having a weight-average molecular weight of 200,000 to 3,000,000.

11. The propylene block copolymer according to claim 1, having a melt flow index (JIS-K-6758) of 0.01 to 3,000 g/10 min.

12. The propylene block copolymer according to claim 1, produced by a continuous polymerization method.

13. The propylene block copolymer according to claim 12, wherein the continuous polymerization method comprises a first stage in which propylene is polymerized as a main component, and a second stage in which propylene and an α-olefin other than propylene are copolymerized.

14. The propylene block copolymer according to claim 13, wherein the amount of the polymer produced in the first stage is from 30 to 95% by weight, and the amount of the polymer produced in the second stage is from 5 to 70% by weight.

15. The propylene block copolymer according to claim 13, wherein the first stage is bulk polymerization, and the second stage is gaseous phase polymerization.

16. The propylene block copolymer according to claim 1, produced in the presence of a stereoregular catalyst comprising a solid catalyst component which contains magnesium, titanium and a halogen, and an organoaluminum compound.

* * * * *